(12) United States Patent
Huynh

(10) Patent No.: US 10,520,976 B2
(45) Date of Patent: Dec. 31, 2019

(54) ELECTRONIC CONTROL PANEL FOR MOTOR VEHICLE

(75) Inventor: Tan Duc Huynh, Neuilly sur Marne (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 0 days.

(21) Appl. No.: 13/883,849

(22) PCT Filed: Nov. 9, 2011

(86) PCT No.: PCT/FR2011/000595
§ 371 (c)(1),
(2), (4) Date: May 7, 2013

(87) PCT Pub. No.: WO2012/062979
PCT Pub. Date: May 18, 2012

(65) Prior Publication Data
US 2013/0222343 A1    Aug. 29, 2013

(30) Foreign Application Priority Data
Nov. 10, 2010  (FR) ..................... 10 04401

(51) Int. Cl.
*G06F 3/041* (2006.01)
*G06F 1/16* (2006.01)

(52) U.S. Cl.
CPC .......... *G06F 1/1601* (2013.01); *G06F 3/0412* (2013.01)

(58) Field of Classification Search
CPC .... G06F 3/0488; G06F 3/04883; G06F 3/044; G06F 3/041–048
USPC ................ 345/156–173; 178/18.01; 701/400
See application file for complete search history.

(56) References Cited

U.S. PATENT DOCUMENTS

| | | | | |
|---|---|---|---|---|
| 6,072,475 A | * | 6/2000 | van Ketwich | G06F 3/0213 345/156 |
| 6,492,978 B1 | * | 12/2002 | Selig | G06F 3/04886 345/168 |
| 6,532,349 B1 | * | 3/2003 | Todome | G03G 15/5016 399/377 |
| 6,949,709 B1 | * | 9/2005 | Barat | B29C 70/70 174/255 |

(Continued)

FOREIGN PATENT DOCUMENTS

| | | |
|---|---|---|
| DE | 41 21 180 A1 | 1/1993 |
| DE | 10 2004 014748 A1 | 10/2005 |

(Continued)

OTHER PUBLICATIONS

International Search Report issued in PCT/FR2011/000595 dated Jan. 24, 2012 (4 pages).

*Primary Examiner* — Sanjiv D. Patel
(74) *Attorney, Agent, or Firm* — Osha Liang LLP

(57) ABSTRACT

The subject of the present invention is an electronic control panel (1) for a motor vehicle, characterized in that it comprises a touch-sensitive screen (3), a touch-sensitive control surface (5) contiguous with said touch-sensitive screen, and a common support (33) for the touch-sensitive screen (3) and for the touch-sensitive control surface (5), the touch-sensitive screen (3) and the touch-sensitive control surface (5) being arranged on the common support (33) at the same level where they meet so as to define a near-continuous control area.

9 Claims, 3 Drawing Sheets

(56) References Cited

U.S. PATENT DOCUMENTS

Figure 1:
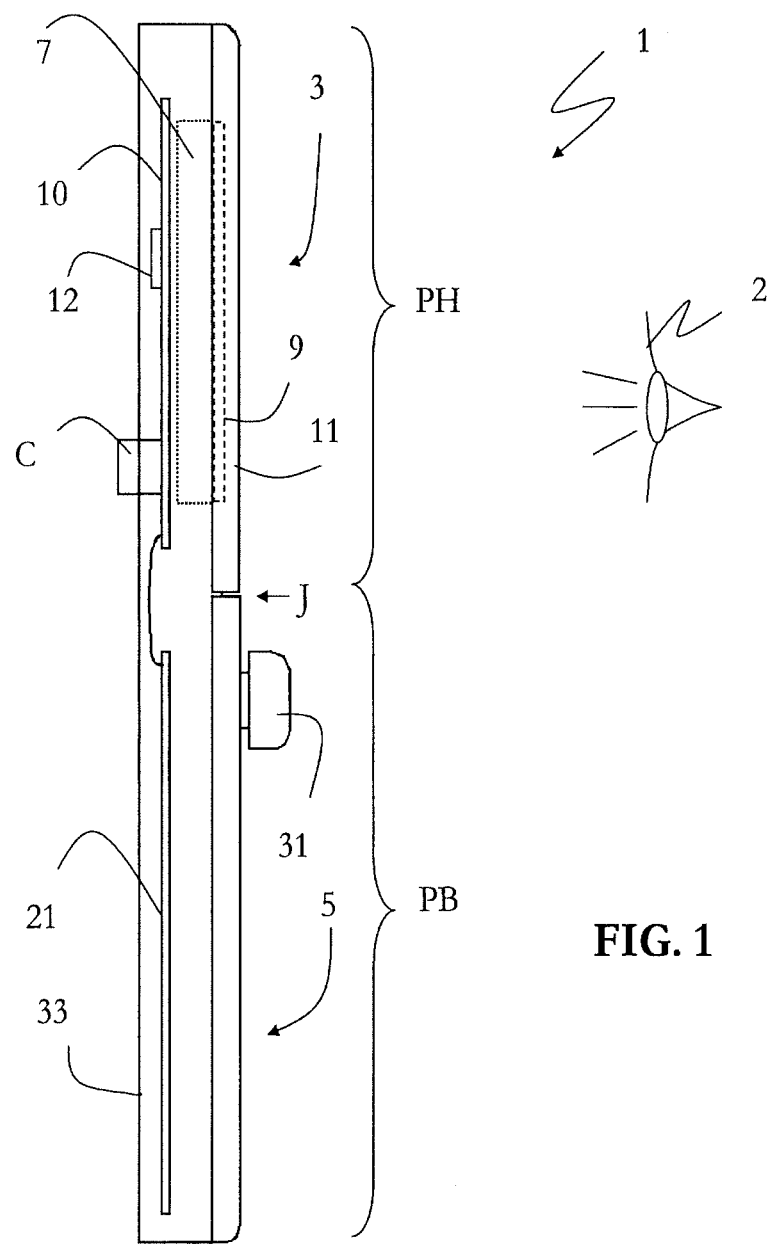

| | | | |
|---|---|---|---|
| 7,403,192 B2* | 7/2008 | Lai | G06F 1/169 345/1.1 |
| 2002/0149572 A1* | 10/2002 | Schulz | G06F 3/044 345/174 |
| 2006/0238517 A1* | 10/2006 | King | G06F 1/1626 345/173 |
| 2008/0062141 A1* | 3/2008 | Chandhri | G06F 3/0482 345/173 |
| 2008/0211779 A1* | 9/2008 | Pryor | G01C 21/3664 345/173 |
| 2009/0146970 A1* | 6/2009 | Lowles et al. | 345/174 |
| 2009/0271731 A1* | 10/2009 | Lin | G06F 3/0483 715/776 |
| 2009/0322705 A1* | 12/2009 | Halsey, IV | G06F 3/044 345/174 |
| 2010/0060568 A1* | 3/2010 | Fisher | G06F 3/03547 345/156 |
| 2010/0214234 A1* | 8/2010 | Singhal | G06F 3/04883 345/173 |
| 2010/0257447 A1* | 10/2010 | Kim | G06F 3/04883 715/702 |
| 2010/0265197 A1* | 10/2010 | Purdy et al. | 345/173 |
| 2010/0277429 A1* | 11/2010 | Day | G06F 3/0416 345/173 |
| 2010/0301879 A1* | 12/2010 | Philipp | G06F 3/03547 324/679 |
| 2011/0134050 A1* | 6/2011 | Harley | G06F 3/041 345/173 |
| 2011/0157029 A1* | 6/2011 | Tseng | G06F 3/04883 345/173 |
| 2011/0157065 A1* | 6/2011 | Murata | G06F 3/04883 345/173 |
| 2011/0320978 A1* | 12/2011 | Horodezky | G06F 3/0488 715/823 |
| 2012/0109455 A1* | 5/2012 | Newman | G06F 3/03547 701/36 |
| 2012/0127071 A1* | 5/2012 | Jitkoff | G06F 3/0481 345/156 |

FOREIGN PATENT DOCUMENTS

| | | |
|---|---|---|
| DE | 10 2004 031659 A1 | 6/2006 |
| WO | 02/084876 A1 | 10/2002 |

* cited by examiner

ELECTRONIC CONTROL PANEL FOR MOTOR VEHICLE

The present invention relates to an electronic control panel for a motor vehicle.

These days, the instrument panel of a motor vehicle comprises, in its middle, a display screen, for example of the TFT type and, seen in a vertical plane underneath, there is a control panel for various functions, such as for example radio, air-conditioning etc. functions.

These zones are currently separated and are not functionally connected.

Moreover, this separation does not always make it possible to obtain an integrated esthetic appearance. In particular, it is currently desirable to obtain control surfaces that are homogeneous on the one hand and smooth on the other hand so that, when the vehicle is switched off, the instrument panel and all the control panels look similar.

With current techniques, this appearance cannot be obtained.

The object of the present invention is to alleviate the aforementioned drawbacks by proposing an electronic control panel that is homogeneous, notably in the switched-off state, and which can provide a maximum of control functionalities in the vehicle.

Accordingly, the subject of the invention is an electronic control panel for a motor vehicle, characterized in that it comprises
- a clutch-sensitive screen,
- a touch-sensitive control surface, contiguous with said clutch-sensitive screen, and
- a common support for the touch-sensitive screen and for the touch-sensitive control surface, the touch-sensitive screen and the touch-sensitive control surface being placed on the common support where they join at the same level so as to define a virtually continuous control plane.

Therefore, it is possible to obtain a homogeneous and smooth appearance of the control panel, in particular when the vehicle is switched off.

This control panel may comprise one or more of the following features taken in isolation or in combination.

The touch-sensitive screen can be covered with a transparent polycarbonate part coated with a nonreflecting varnish. This gives, when the screen is switched off, a very esthetic shiny black effect.

According to another aspect, the touch-sensitive control surface comprises a transparent polycarbonate part painted black on the face opposite to that designed to be facing a user and comprising functional pictograms. This gives, when the vehicle is switched off, a mat black effect which perfectly matches the shiny appearance of the screen in the switched-off state.

Also provided are pictograms produced by laser scratching for the touch-sensitive control surface which allows a considerable accuracy of production.

According to one embodiment, the touch-sensitive control surface comprises a capacitive film bonded to the face opposite to that designed to be facing a user.

This is a simple, low-cost solution.

A valuable synergetic effect can be obtained if the touch-sensitive screen is surrounded by the touch-senstive control surface. It is therefore possible to combine the information and touch-sensitive controls of the screen and of the touch-sensitive surface.

According to another embodiment, seen in a generally vertical plane, provision is made for the touch-sensitive screen to be placed above the touch-sensitive control surface.

According to yet another development, the touch-sensitive control surface is curved.

Then, for certain controls, for example the adjustment of volume for the radio, the touch-sensitive control surface also comprises at least one rotary control button passing through said surface.

Figure 2:
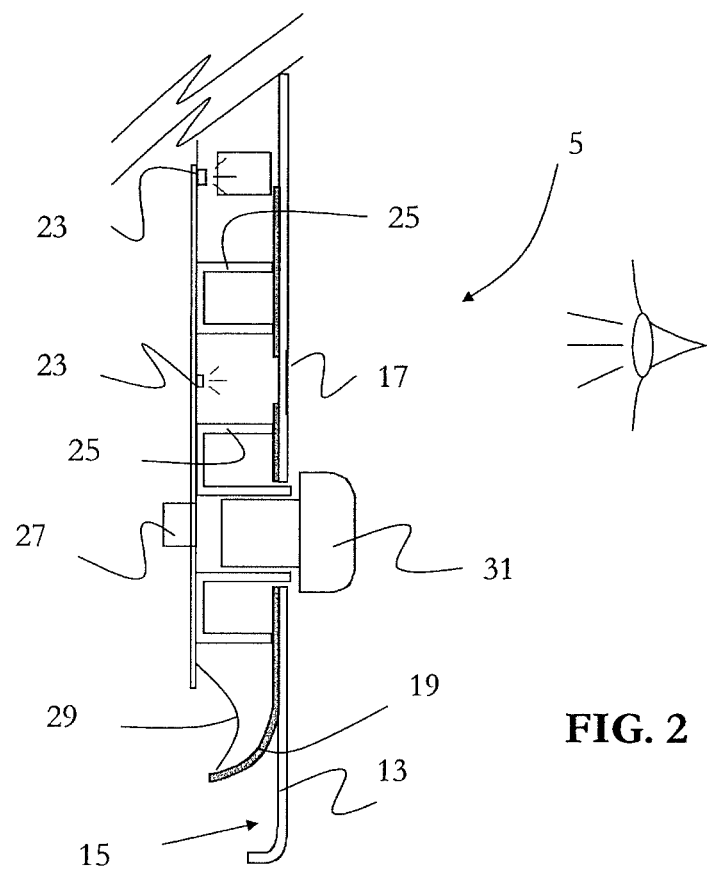
Figure 3:
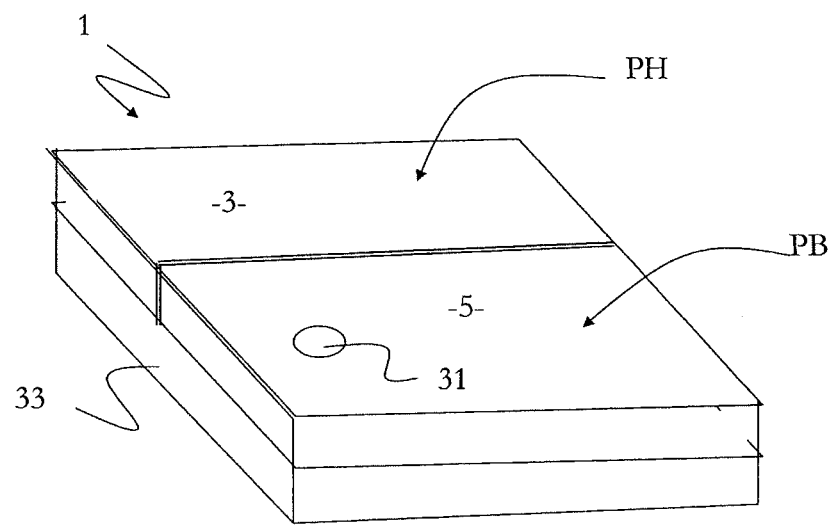
Figure 4:
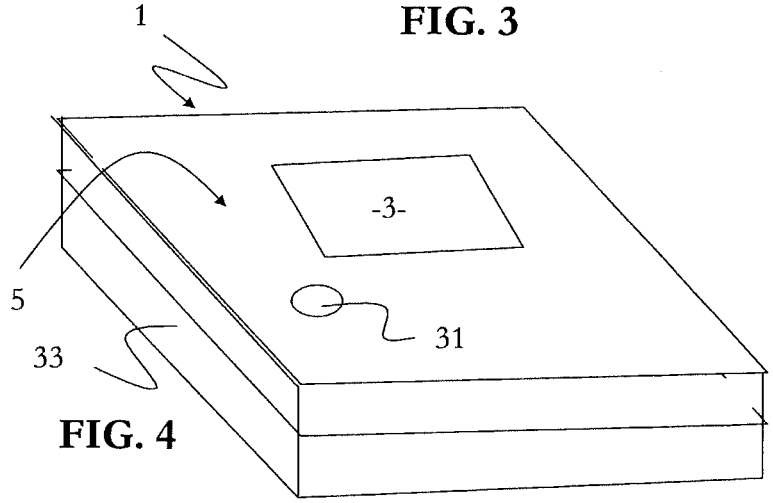

Other features and advantages of the invention will emerge from the following description, given as an example, without being limiting in nature, with respect to the appended drawings in which:

FIG. 1 is a sectional view from the side of an electronic control panel according to invention, FIG. 2 is a sectional view from the side of the bottom portion of FIG. 1, and FIG. 3 is a diagram showing a view in perspective of the embodiment of FIGS. 1 and 2, FIG. 4 is a diagram showing a view in perspective of an alternate embodiment.

In all the figures, the same elements bear the same reference numbers.

FIG. 1 shows a sectional view from the side of an electronic control panel 1 according to the invention. Also shown is the eye of a user 2.

This panel can be incorporated for example into an instrument panel of a motor vehicle, more particularly in its center.

This control panel comprises mainly two portions, a top portion PH and a bottom portion PB seen in a generally vertical plane. In this manner, when for example the driver turns his head slightly from his seat, his gaze is facing the top portion PH, then if he subsequently slightly lowers his head his gaze will rest on the bottom portion PB.

The top portion PH comprises a touch-sensitive screen 3 and the bottom portion PB a touch-sensitive control surface 5 contiguous with said touch-sensitive screen at a join J represented exaggeratedly in the figure so as to better illustrate the invention.

The touch-sensitive screen 3 may for example be formed by a superposition of an information-data or control display screen 7 and a capacitive touch-sensitive faceplate 9 having a control surface for the input of commands by a user.

The screen 7 comprises for example a TFT display (using the "Thin Film Transistor" technology.

The capacitive touch-sensitive faceplate 9 is transparent so as to be placed on the screen 7 and serve as an input means. The capacitive touch-sensitive faceplate 9 is for example made according to the ITO technology that is to say it is for example made of glass and comprises for example an ITO (Indium-Tin Oxide) material, such as in thin layers allowing both a good electrical conductivity and an optical transparency.

The capacitive touch-sensitive faceplate 9 makes it possible to determine the coordinates of the point where the user presses his finger on the control surface. The movement or pressing of the finger of a user causes the creation of a signal varying with the location and movement of his finger on contact and along the extent of this surface.

According to the present example, the touch-sensitive screen 3 is covered with a transparent polycarbonate part 11 coated with a nonreflecting varnish. When the screen 7 is switched off, this gives a very esthetic shiny black effect.

Placed on the rear face of the screen 7 is a printed circuit board 10 supporting for example a microprocessor 12 and a connectivity element C, for example of the ADC type, with the onboard computer of the vehicle.

The bottom portion PB will now be described in greater detail with reference to FIGS. 1 and 2.

The touch-sensitive control surface 5 comprises for example a thin part 13 of transparent polycarbonate coated with a black paint on the face 15 opposite to that designed to be facing a user 2.

Functional pictograms 17, for example to indicate specific control zones, such as zones for controlling the air-conditioning or audio functions, can be produced by laser scratching on the part 13, which allows considerable production accuracy.

A capacitive film 19 is bonded to the painted face 15, opposite to that designed to be facing a user 2, by a dielectric adhesive making it possible to communicate charges from the control surface to the capacitive film 19.

Such a capacitive film is known from document WO02/084876. This film can equally be transparent or opaque.

This is a simple low-cost solution.

Placed on a printed circuit board 21 are light-emitting diodes 23 for the backlighting of the pictograms of the polycarbonate part 13.

Spacers 25 between the printed circuit board 21 and the polycarbonate part 13 allow not only an effective mechanical connection but also make it possible to compartmentalize the lighting zones of the light-emitting diodes 23.

The printed circuit board 21 also supports on its rear face a control circuit 27 for the capacitive film 19 that is connected to the latter by an electrical link 29.

Then, for certain controls, for example the adjustment of volume for the radio, the touch-sensitive control surface also comprises at least one rotary control button 31 passing through said control surface 5.

It can therefore be understood that the electronic control panel 1 makes it possible to have a large capacitive control surface with two different capacitive technologies while presenting, at least in the off-state, a homogeneous and uniform appearance for the user.

Specifically, when the vehicle is switched off, this gives, for the bottom portion PB a mat black effect which perfectly matches the shiny appearance of the touch-sensitive screen 3 when it is switched off.

Both the touch-sensitive screen 3 and the touch-sensitive control surface 5 are attached to a common support 33, made for example of plastic by molding, by appropriate attachment means. This support may for example present shapes for accommodating the touch-sensitive screen 3 and the touch-sensitive surface 5 and attachment means by screwing, snap-fitting and/or bonding.

The touch-sensitive screen 3 and the touch-sensitive control surface 5 are placed on the common support 7 where they join at J at the same level so as to define a virtually continuous control plane.

A schematic view in perspective is shown in FIG. 3. This therefore gives an electronic control panel that is attractive and easily adaptable to the needs of motor-vehicle manufacturers depending on the functionalities that must be provided on this panel 1.

According to the example of FIGS. 1 to 3, the touch-sensitive control surface 5 is flat. However, while maintaining this surface continuity between the touch-sensitive screen 3 and the touch-sensitive control surface 5, it is possible to provide, in another development not shown, for the touch-sensitive control surface to be curved.

FIG. 4 shows another embodiment which differs from that of FIGS. 1 to 3 in that the touch-sensitive screen 3 is surrounded by the touch-sensitive control surface 5.

This therefore gives low-cost, additional touch-sensitive control surface zones not only below but also beside and above the touch-sensitive screen 3.

It is therefore possible to combine the information and touch-sensitive controls of the touch-sensitive screen 3 and of the touch-sensitive surface 5.

The invention claimed is:

1. An electronic control panel for a motor vehicle, comprising:
   a touch-sensitive display screen of a first capacitive structural construction;
   a touch-sensitive control surface of a second capacitive structural construction different from said first capacitive structural construction, contiguous with said touch-sensitive display screen; and
   a common support for the touch-sensitive display screen and for the touch-sensitive control surface,
   wherein the touch-sensitive display screen and the touch-sensitive control surface are disposed on top of the common support and joined at a same level to define a homogeneous, uniform, and virtually continuous control plane when said electronic control panel is in an off-state, and
   wherein the touch-sensitive display screen and the touch-sensitive control surface form an entirety of a top-most surface of the electronic control panel.

2. The electronic control panel for the motor vehicle as claimed in claim 1, wherein the touch-sensitive display screen is covered with a transparent polycarbonate part coated with a nonreflecting varnish.

3. The electronic control panel for the motor vehicle as claimed in claim 1, wherein the touch-sensitive control surface comprises a transparent polycarbonate part painted black on the face opposite to that designed to be facing a user and comprising functional pictograms.

4. The electronic control panel for the motor vehicle as claimed in claim 3, wherein the pictograms are produced by laser scratching.

5. The electronic control panel for the motor vehicle as claimed in claim 3, wherein the touch-sensitive control surface comprises a capacitive film bonded to the face opposite to that designed to be facing a user.

6. The electronic control panel for the motor vehicle as claimed in claim 3, wherein the touch-sensitive display screen is surrounded by the touch-sensitive control surface.

7. The electronic control panel for the motor vehicle as claimed in claim 1, wherein, seen in a generally vertical plane, the touch-sensitive display screen is placed above the touch-sensitive control surface.

8. An electronic control panel for a motor vehicle, comprising:
   a touch-sensitive display screen of a first capacitive structural construction;
   a touch-sensitive control surface of a second capacitive structural construction different from said first capacitive structural construction, contiguous with said touch-sensitive display screen; and
   a common support for the touch-sensitive display screen and for the touch-sensitive control surface,
   wherein the touch-sensitive display screen and the touch-sensitive control surface are disposed on top of the common support and joined at a same level to define a homogeneous, uniform, and virtually continuous control plane when said electronic control panel is in an off-state, wherein the touch-sensitive display screen and the touch-sensitive control surface form an entirety of a top-most surface of the electronic control panel, and wherein the touch-sensitive control surface is curved.

9. An electronic control panel for a motor vehicle, comprising:

a touch-sensitive display screen of a first capacitive structural construction;

a touch-sensitive control surface of a second capacitive structural construction different from said first capacitive structural construction, contiguous with said touch-sensitive display screen; and a common support for the touch-sensitive display screen and for the touch-sensitive control surface, wherein the touch-sensitive display screen and the touch-sensitive control surface are disposed on top of the common support and joined at a same level to define a homogeneous, uniform, and virtually continuous control plane when said electronic control panel is in an off-state, wherein the touch-sensitive display screen and the touch-sensitive control surface form an entirety of a top-most surface of the electronic control panel, and wherein the touch-sensitive control surface also comprises at least one rotary control button passing through said surface.

* * * * *